(12) United States Patent
Gupta et al.

(10) Patent No.: US 10,038,321 B2
(45) Date of Patent: Jul. 31, 2018

(54) SYSTEM FOR OPERATION OF PHOTOVOLTAIC POWER PLANT AND DC POWER COLLECTION WITHIN

(71) Applicant: First Solar, Inc., Perrysburg, OH (US)

(72) Inventors: Ranjan K. Gupta, Perrysburg, OH (US); Kevin G. Collins, Perrysburg, OH (US)

(73) Assignee: First Solar, Inc., Tempe, AZ (US)

( * ) Notice: Subject to any disclaimer, the term of this patent is extended or adjusted under 35 U.S.C. 154(b) by 346 days.

(21) Appl. No.: 14/872,889

(22) Filed: Oct. 1, 2015

(65) Prior Publication Data

US 2016/0099572 A1 Apr. 7, 2016

Related U.S. Application Data

(60) Provisional application No. 62/058,721, filed on Oct. 2, 2014.

(51) Int. Cl.
| | |
|---|---|
| *H02J 3/38* | (2006.01) |
| *H02J 9/06* | (2006.01) |
| *H02M 3/04* | (2006.01) |
| *H02M 7/44* | (2006.01) |

(52) U.S. Cl.
CPC .............. *H02J 3/383* (2013.01); *H02J 3/385* (2013.01); *H02J 9/06* (2013.01); *H02M 3/04* (2013.01); *H02M 7/44* (2013.01); *Y02E 10/58* (2013.01)

(58) Field of Classification Search
CPC .................................. H02J 3/383; H02J 3/385
USPC ....................................................... 307/52, 43
See application file for complete search history.

(56) References Cited

U.S. PATENT DOCUMENTS

| | | | |
|---|---|---|---|
| 8,013,472 | B2 | 9/2011 | Adest et al. |
| 8,050,062 | B2 | 11/2011 | Wagoner et al. |
| 8,085,564 | B2 | 12/2011 | Klodowski et al. |
| 8,130,518 | B2 | 3/2012 | Fishman |
| 8,138,631 | B2 | 3/2012 | Allen et al. |
| 8,294,303 | B2 | 10/2012 | Eaglesham et al. |
| 8,427,010 | B2 | 4/2013 | Bose et al. |
| 2011/0241433 | A1 | 10/2011 | Sihler et al. |
| 2012/0080955 | A1 | 4/2012 | Fishman et al. |
| 2013/0197704 | A1 | 8/2013 | Pan et al. |
| 2013/0200714 | A1 | 8/2013 | Pan et al. |
| 2014/0091630 | A1 | 4/2014 | Kim et al. |
| 2014/0117761 | A1 | 5/2014 | Km et al. |
| 2014/0117965 | A1 | 5/2014 | Km et al. |

FOREIGN PATENT DOCUMENTS

| | | | |
|---|---|---|---|
| EP | 2 293 407 A1 | 3/2011 | |
| EP | 2 315 348 B1 | 8/2012 | |
| EP | 2 461 456 B1 | 7/2014 | |
| WO | WO 2011/033308 A2 | 3/2011 | |
| WO | WO 2011033308 A2 * | 3/2011 | ............... H02J 3/36 |
| WO | WO 2014/121826 A1 | 8/2014 | |
| WO | WO 2014/124672 A1 | 8/2014 | |

* cited by examiner

*Primary Examiner* — Thomas Skibinski
(74) *Attorney, Agent, or Firm* — MacMillan, Sobanski & Todd, LLC

(57) ABSTRACT

A system is disclosed for extracting a medium DC voltage from a plurality of PV modules arranged in an array and supplying the medium DC voltage to inverters located outside the array near a point of interconnection with a utility grid.

50 Claims, 12 Drawing Sheets

SYSTEM FOR OPERATION OF PHOTOVOLTAIC POWER PLANT AND DC POWER COLLECTION WITHIN

CROSS-REFERENCE TO RELATED APPLICATION

This application claims priority to U.S. Provisional Application No. 62/058,721, filed Oct. 2, 2014, which is hereby fully incorporated by reference.

TECHNICAL FIELD

The present invention relates to the collection of DC power from a photovoltaic (PV) power plant, comprising a plurality of PV modules arranged in an array, and the connection of the power plant to an AC utility grid.

BACKGROUND OF THE INVENTION

A typical large-scale PV power plant employs a plurality of PV modules arranged in an array and DC/AC inverters and AC voltage step-up transformers located within the array for converting DC power from the PV modules to AC power for transport from the array to and connection with the utility grid. There are various ways to connect the PV modules through to DC/AC inverters to the grid which may include DC combiners for combining the DC outputs of the modules together and feeding the combined DC output from the modules to the DC/AC inverters located within the array. The transformers within the array step-up the AC voltage and the AC output from the transformers is then fed through a medium voltage AC (MVAC) power collection system to a substation located at a point of interconnection (POI) with the grid.

One such commonly employed system is shown in FIG 1. It includes groups of PV modules 11, with each group including a plurality of PV modules 11 with outputs connected in series, parallel or series/parallel relationship. Each module group is connected to a combiner box 15, sometimes referred to as a junction box, which electrically combines the DC outputs of the PV modules 11 of a group, or the DC outputs of one or more groups, together and sends the combined DC voltage over DC bus lines 17 to DC/AC inverters 19. The inverters 19 convert the DC outputs from the DC combiner boxes 15 to an AC voltage which is then sent to the step-up transformers 21, associated with each of the inverters 19, for a stepped-up medium voltage AC, e.g. 34.5 kV output voltage, which is applied to an AC medium voltage bus 23. The inverters 19 and associated transformers 21 form a power conversion station 100. The AC voltage outputs from the transformers 21 may also optionally be connected together in combining switchgear 38 and the combined AC voltage applied to the medium voltage AC bus 23. The AC bus 23 may connect the transformers 21 directly, or through the combining switchgear 38, to a power substation 25 located adjacent a point of interconnection with the utility grid 27. Although FIG 1 illustrates only four groups of modules 11 and combiner boxes 15 and two inverters 19 and associated transformers 21 and an optional combining switchgear 38, it should be appreciated that a large scale power plant will have many more PV module 11 groups, combiner boxes 15, inverters 19, associate transformers 21 and optional switchgear 38, arranged throughout an array, as illustrated in greater detail in FIGS. 3 and 4. For sake of simplicity, FIGS. 3 and 4 do not show the optional combining switchgear 38.

FIG 1 also illustrates in simplified form an example of a power plant control structure. It includes a power plant controller 60 located at the substation 25, or at another centralized location, and an associated SCADA user interface 34 for entering commands and data into power plant controller 60. The power plant controller 60 is also connected to the point of interconnection to the grid, via lines 36, for receiving measured grid parameters such as voltage, current and frequency. The power plant controller 60 sends commands to and receives data from a local controller 42, which in turn, controls the inverters 19 and the combining switchgear 38, if present. The local controller 42 sends commands to and receives data from power conversion station 100 and exchanges data with plant controller 60.

FIG 2 illustrates an enlarged view of a portion of FIG 1 with additional array structures, which may also be employed in the FIG 1 system. A back-up power supply 71 can be incorporated at the location of one or more inverters 19 which is connected to the output of inverter 19 and contains a step down transformer 73, an AC/DC converter 75, a DC storage system 81 e.g. a battery storage system, and a DC/AC converter 79. The DC/AC converter 79 supplies three phase AC voltage in the array as a supply voltage for a plurality of tracker controllers 16 which supply voltage and control signals to respective tracker actuators 44, which may be in the form of motors and associated linkages. The tracker actuators 44 operate to rotate a set of the PV modules 11 (also referred as table of modules) to track the position of the sun, or to place the PV modules 11 in a particular position for cleaning, maintenance or for protection of the PV modules 11 during storm conditions, as known in the art.

FIG 3 illustrates a top down view of the PV module array 32 layout of the FIGS. 1 and 2 system, while FIG 4 represents a partial enlarged and simplified electrical view of the array layout showing the interconnection of various elements. As can be seen in FIGS. 3 and 4, a plurality of DC lines 17 typically run in underground DC trenches 22 throughout the PV module array 32. The PV modules 11 are electrically connected to the combiner boxes 15 by lines 13 (FIG 4), while several combiner boxes 15 are, in turn, electrically connected to an associated inverter 19 by DC lines 17. The DC lines 17 typically run through the array 32 in a first direction shown by double-headed arrow A. The inverter 19 is connected to an associated transformer 21 (only one inverter 19 and transformer 21 are shown in FIG 4). The AC output of transformers 21, at for example, a medium three phase AC voltage of, e.g. 34.5 kv AC, is connect to AC bus lines 23 which typically run in underground trenches 24 through the array in a second direction indicated by double-headed arrow B, which is orthogonal to the direction A of the DC lines 17. Portions of the AC bus lines 23 are also routed through trenches 22 in a direction A into a substation 25 at a location adjacent the point of interconnection with the grid 27, as best shown in FIG 3. The AC voltage, which supplies the tracker controllers 16 (FIGS. 2, 4), is applied over AC wires 20 which may also be provided in the trenches 22.

The system illustrated in FIGS. 1-4 has several drawbacks. Typically tens of wires 13 at 1-2 kv DC from PV modules 11 are tied together in the combiner boxes 15 into a reduced set of +Ve, −Ve and ground wires 17, typically hundreds of feet long which are laid in the trenches 22. The DC wires 17 connect to the inverters 19 with fewer, thicker wires, typically at 1-2 kv DC. The running of the many DC wires 17 to the inverters 19 and associated transformers 21 within the PV module 11 array is cost intensive, both in terms of material and labor, and incurs power losses as well.

In addition, the many inverters 19 and transformers 21 provided within and throughout the array, and the combining switchgear 38, if provided, and the wiring of the same is also material and labor cost intensive. The number of inverters 19 and transformers 21 which are provided throughout the array 32 also occupy valuable real estate, which could otherwise be occupied with additional PV modules 11. The AC lines 23 routed through the array in trenches 24 and 22 also add to material and labor costs. In addition, the AC lines 23 also must extend over distances which are typically thousands of feet long from transformers 21 to substation 25 which causes significant active and reactive power losses which, in turn, requires a larger electrical rating for the inverters 19 and transformers 21. Such line lengths and the number of lines 23 for a given size of array 32 also introduce transient voltage conditions on AC bus lines 23, e.g. when transformers 21 are energized, to the substation 25 which may cause transient conditions on the grid 27 and some delay in restarting the inverters 19 and transformers 21 after a grid failure.

At night time, when power is not being generated by the PV modules 11, the AC lines 23 between the transformers 19 and substation 25 are supplied with AC power by the substation 25 to keep transformers 21 energized to facilitate restarting the system for daytime operation with attendant no-load transformer 21 and AC line 23 losses. The no-load losses can be eliminated in an alternate scheme in which transformers 21 must be supplied with disconnect switches, which disconnect the transformers 21 from the AC bus lines 23 during night time conditions. Use of such a switch at each of transformers 21 adds to cost, and when such switches reconnect the transformers 21 to the AC bus lines 23, cause an undesirable high voltage transient condition on the grid, and loss of transformer mechanical integrity and therefore life, due to repeated cycles of magnetizing inrush current. The array 32 needs a utility voltage (AC grid voltage) for the in-array transformers 21, and inverter 19 to start, and practically cannot work in a stand-alone, so-called "island" operation mode, to supply power to a large load of similar rating in a situation where the array 32 is not connected to a grid. The lack of island mode is due to the practical challenges of synchronization (phase locking during startup and transient) of hundreds of inverters 19, in order to create a source of sufficient short circuit capacity for a large scale power plant when there is no grid voltage available. Due to the same challenge, the array 32 cannot establish a grid voltage at the utility grid for so-called "black start" conditions, where the utility needs voltage from the array to restart its grid through auxiliary generators.

Additionally, due to the presence of long medium voltage AC cables 23, the control bandwidth of inverters 19 to perform grid voltage support function is lower compared to the control bandwidth of a STATCOM (Static Compensator) device, well known in the art, to perform the same function. Overall, the inverters 19 and associated architecture generally has poor behavior in weak grids and relative slow response to transient grid conditions, resulting in significant integration challenges to integrate hundreds of inverters with the power system (grid). Furthermore, overall plant control latency is significant as the coordinated startup and operation of hundreds of inverters 19 in a large array takes time to execute.

An improved array architecture for mitigating many of these issues would be desirable.

DETAILED DESCRIPTION OF THE INVENTION

Disclosed embodiments provide a medium voltage DC (MVDC) PV array architecture in which no inverters, associated transformers or combining switchgear are provided within the array, thereby allowing for an increase in the number of PV modules which can be placed within the array and a simplified and cost effective wiring of the array to a substation located adjacent a point of interconnection with a utility grid. A plurality of PV module groups are each directly connected to a respective multiport DC/DC converter which provides for interconnection of the PV modules of the group, and a step-up of the DC voltage from the PV module voltage to a higher level DC voltage, such as a medium DC voltage (MVDC) in the range of ±5 kv to ±20 kv, for transmission on a respective DC bus connected to a respective out-of-array inverter and associated transformer at the substation.

The multiport DC/DC converter also provides control functions for controlling (1) the input voltage, current or power of PV modules to which it is connected, (2) the output voltage, current or power on the higher voltage DC bus to which it is connected, (3) a local power storage and (4) tracker actuators. The multiport DC/DC converter also has self-start capability enabling the array to start and provide voltage on the DC bus without requiring a grid voltage. The elimination of inverters from within the array in favor of an inverter at the substation also reduces overall system control latency. The substation contains the out-of-array inverter associated with each DC bus, and a transformer associated with each inverter, for converting the incoming medium DC voltage on the DC bus to the AC voltage required by the grid.

A power plant controller controls the out-of-array inverter and multiport DC/DC converter to operate both to jointly manage the voltage, current and power on the DC bus. The power plant controller also controls the inverter during normal system operation and at startup to control power applied to the grid, and is able to control the DC/DC converter to self-start and provide the system with black start and islanding functions. These and other additional features and advantages of the invention will be more fully understood from the following detailed description of specific embodiments.

Figure 5:
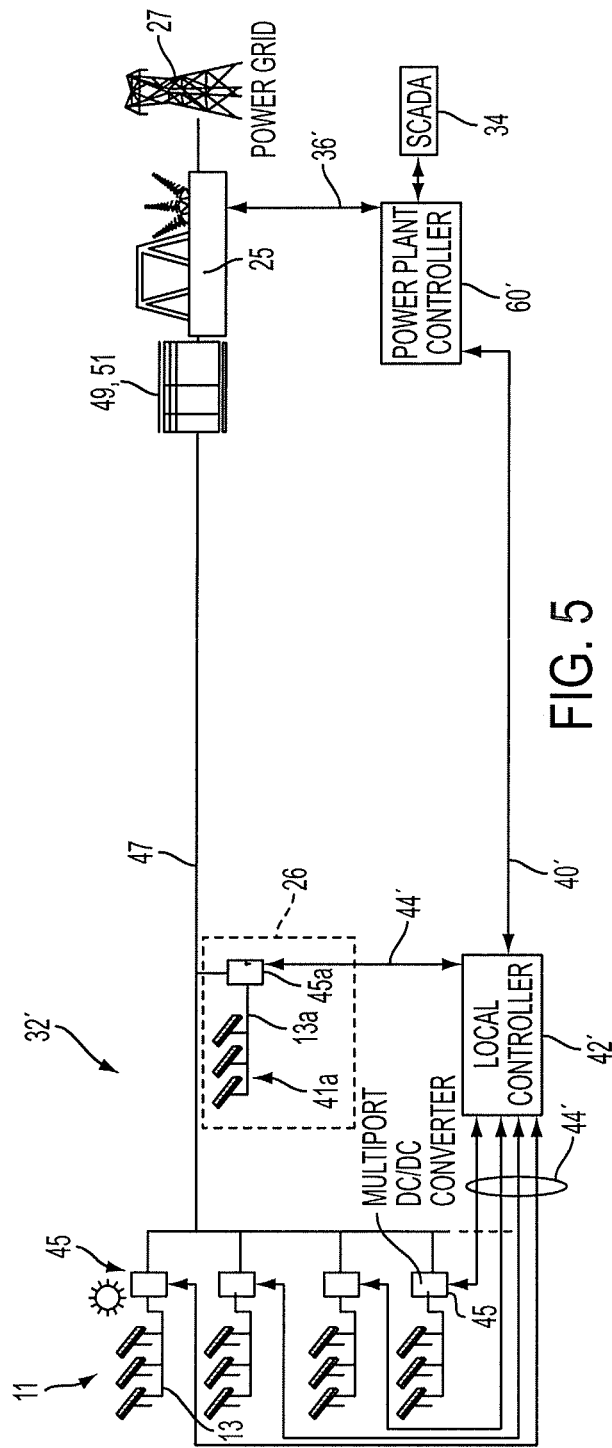
FIG. 5 illustrates in block electrical diagram one embodiment of the invention.
Figure 6:
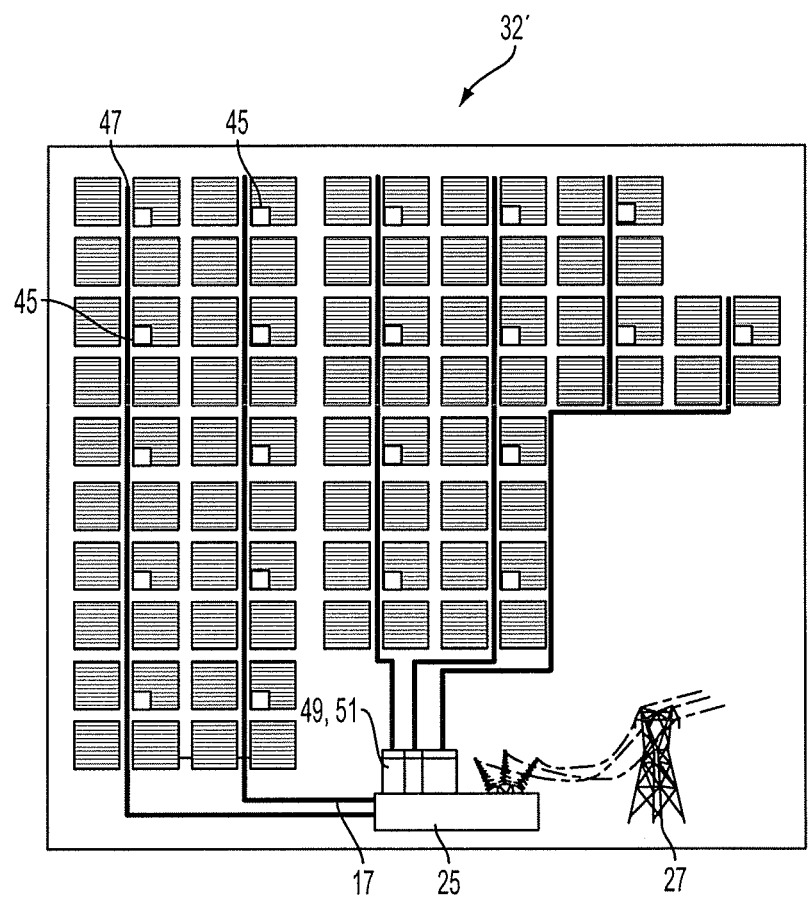
FIG. 6 illustrates a PV module array incorporating the FIG 4 embodiment.
Figure 7:
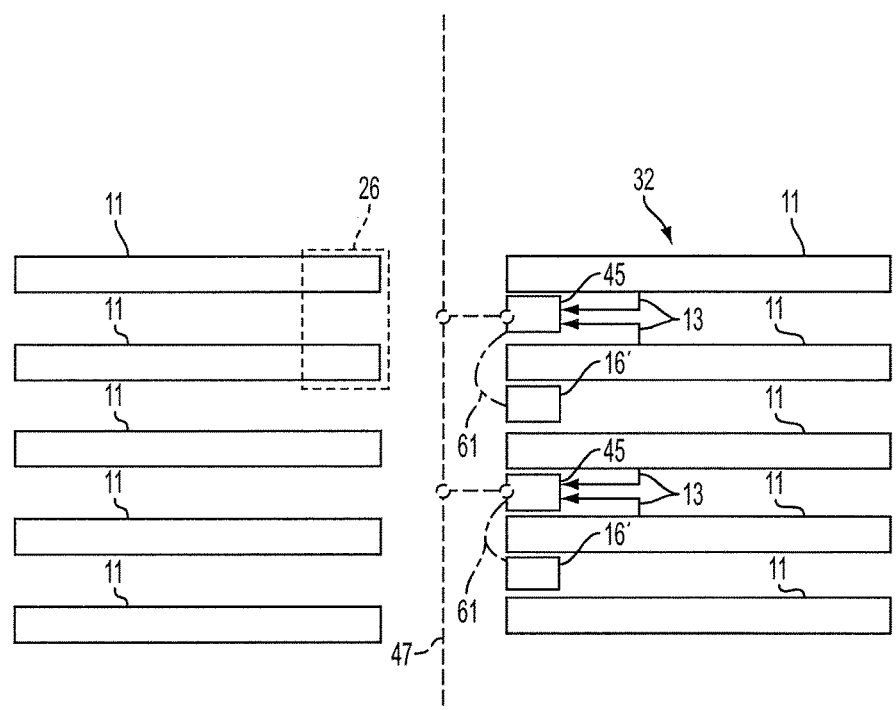
FIG. 7 illustrates in block diagram an enlarged portion of FIG 5.

FIG 5 illustrates in block electrical diagram an embodiment of the invention, while FIG 6 illustrates a top down view of a PV module array 32' employed in the FIG 5 embodiment, and FIG 7 illustrates an enlarged view of a portion of the FIG 6 array 32'.

As shown in FIGS. 5-7, a plurality of PV modules 11 are connected together in series, parallel or a combination of series and parallel and the combined voltage output on multiple DC voltage lines 13 is fed to a multiport DC/DC converter 45, the construction of which is described below in connection with FIG 9-15. Although FIG 5 shows only four groups of PV modules 11 and associated multiport DC/DC converters 45, and one DC bus line 47, it should be appreciated that in actual practice there will be many more groups of PV modules 11 and associated multiport DC/DC converters 45 and associated DC bus lines 47.

Each multiport DC/DC converter 45 transforms a lower DC voltage input thereto, e.g. in the range of up to 2 kv DC, for example, in a range of 1-2 kv DC from the PV modules 11, to a higher, voltage DC such as a medium level voltage in the range of up to ±20 kv, for example, in the range of ±5 kv to ±20 kv, for example, a voltage of ±10 kv DC. The outputs of the multiport DC/DC converters 45 are connected in parallel to a medium voltage DC (MVDC) bus 47, which has +Ve,−Ve, and ground wires, and which runs through the PV module array 32' in trenches 22 (FIG 7) to a centralized inverter 49 and associated transformer 51 at substation 25, located adjacent the point of interconnection (POI) with grid 27. Although FIG 5 shows one inverter 49 and transformer 51, in actual practice there may be a plurality of inverters 49 and transformers 51 connected to respective DC busses 47 depending on the size of array 32'. The inverters 49 and transformers 51 are typically located outside the array 32' and the number of inverters 49 and transformers 51 is considerably less than the number of in-array inverters 19 and transformers 21 used in the system of FIGS. 1-4. Since all inverters 49 and associated transformers 51 are outside the PV module array 32' valuable real estate 26 is freed up for additional PV modules 41a and multiport DC/DC converters 45a, or alternatively for connecting additional modules 41a with the existing modules 11 without the need of an additional multiport DC/DC converter 45a. This increases the available power output from the array 32' for a given area. This can provide a higher DC/DC voltage ratio (analogous to the DC/AC ratio well known in the art) or a higher power density for the PV array 32'. A higher power density can be effectively used by the multiport DC/DC converters 45 since they do not need to deliver AC reactive power as in the MVAC plant architecture.

The system illustrated in FIGS. 5-7, using a medium voltage DC bus 47 to supply DC voltage to inverter 49, has additional advantages over the FIGS. 1-4 system. The low voltage (up to 2 kv, e.g. in the range of 1 to 2 kv) DC lines 17 needed to connect combiner boxes 15 to in-array inverters 19 are eliminated, thereby reducing equipment and installation costs. The elimination of inverters 19 and transformers 21 from within the array 32' as well as the elimination of the MVAC trench 24 (FIG 3) in the array 32' also reduces equipment and installation costs. Further, there are no reactive power losses in the medium voltage DC bus 47, compared to AC bus 23. Such losses in an AC system require increased power ratings and thus cost for the in-array inverters 19 and transformers 21.

The inverters 49 and transformers 51 at substation 25 convert the MVDC (up to ±20 kv DC, for example, ±5 kv DC to ±20 kv DC, for example, ±10 kv DC) on DC bus 47 to the required utility grid voltage, e.g. to 230 kvAC. Any necessary fault protection devices (DC or AC) can also be fewer in number and included at the inverters 49 and outside the PV array 32'.

Figure 1:
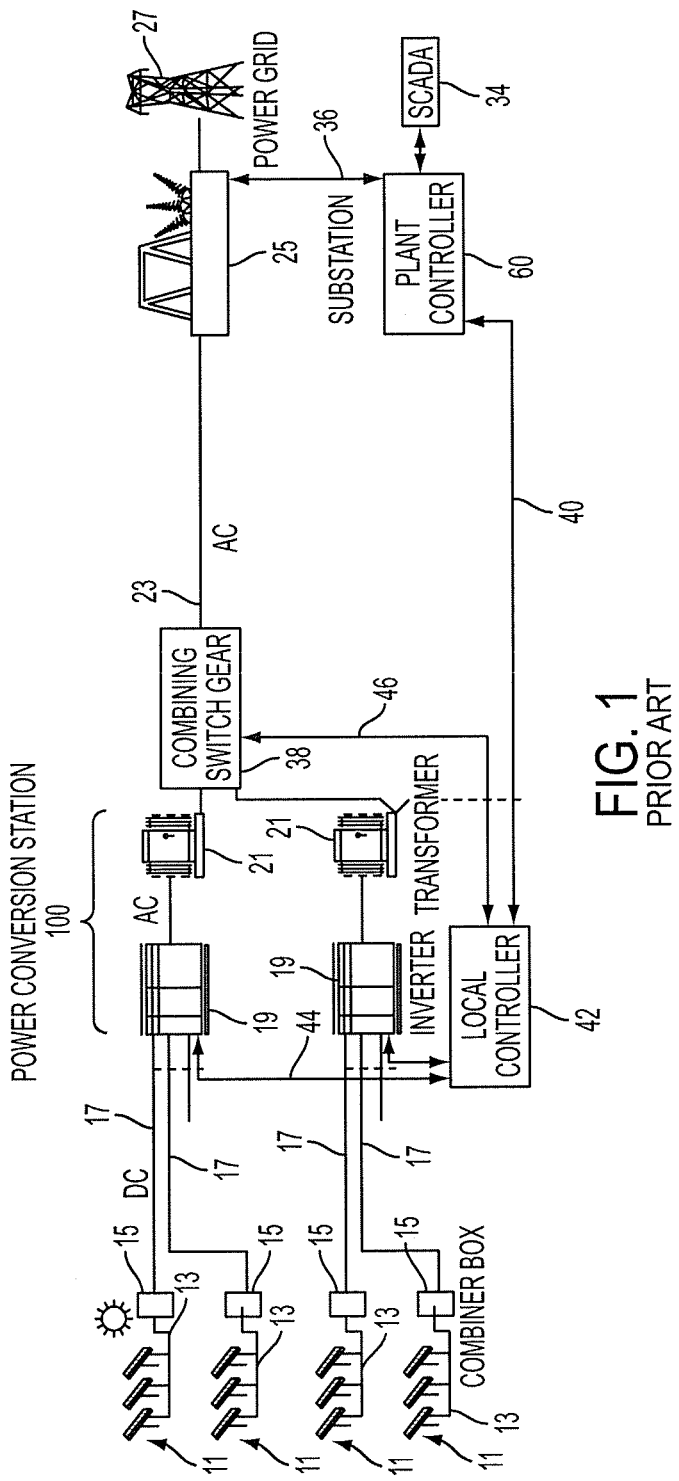
FIG. 1 illustrates in block electrical diagram a prior art photovoltaic power generating system.

Still further, the FIGS. 5-7 system, having all DC voltage in array 32' does not require any AC power back to in-array transformers 21 (FIG 1) during nighttime operation, as required in the FIG 1 system, thereby eliminating no-load power losses inherent in the FIGS. 1-4 transformers 21. Also, the use of an all DC system in array 32' can reduce, or perhaps eliminate, the need for capacitor banks or reactive power supply devices at the substation 25, which are typically required in the AC bus system of FIGS. 1-4. Further, since the inverters 49 at substation 25 are located close to the point of interconnection with the utility grid 27 and are fewer in number compared with the system illustrated in FIGS. 1-4, system control latency is significantly decreased.

Figure 2:
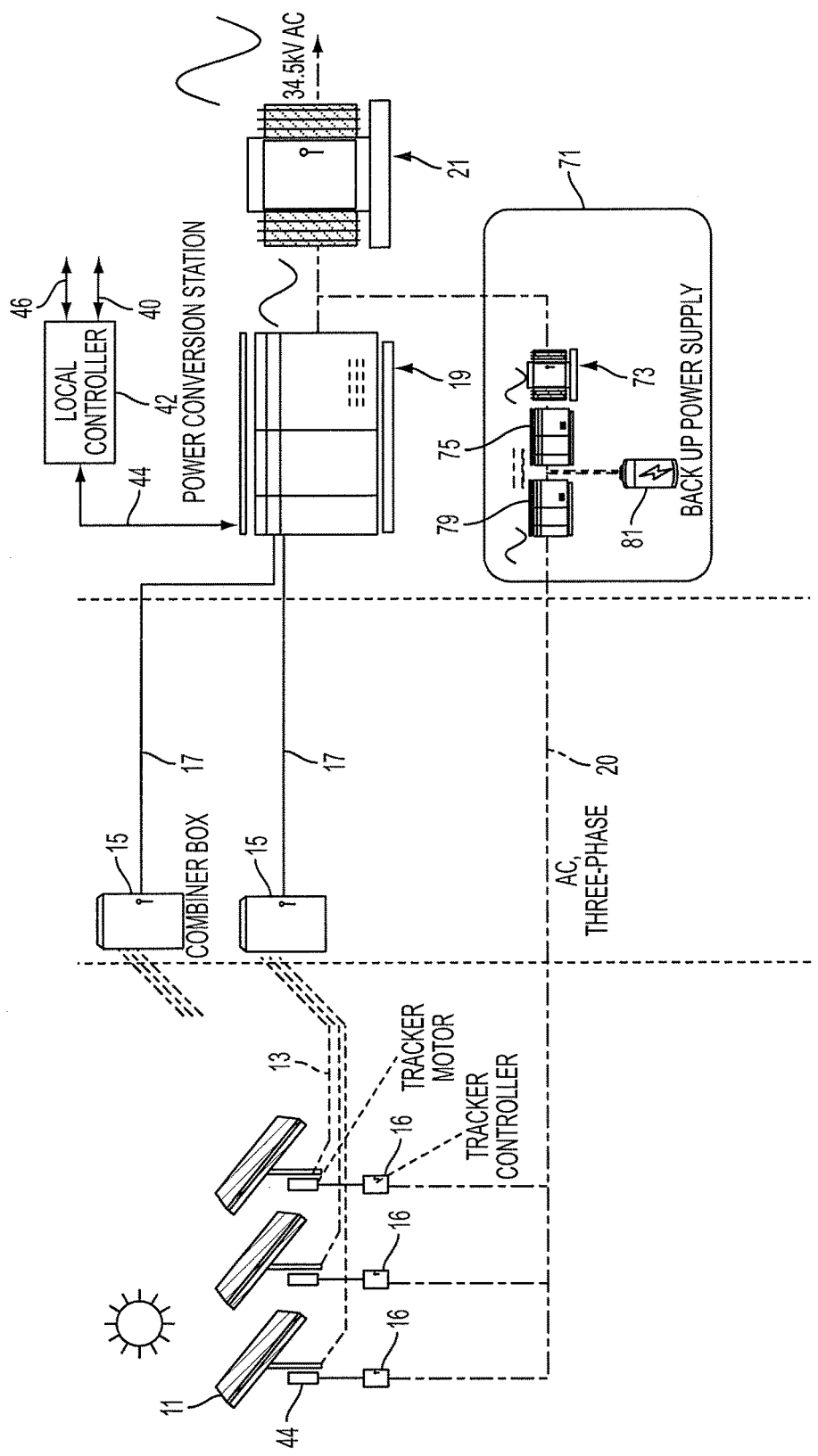
FIG. 2 illustrates additional aspects of the FIG 1 prior art system.
Figure 3:
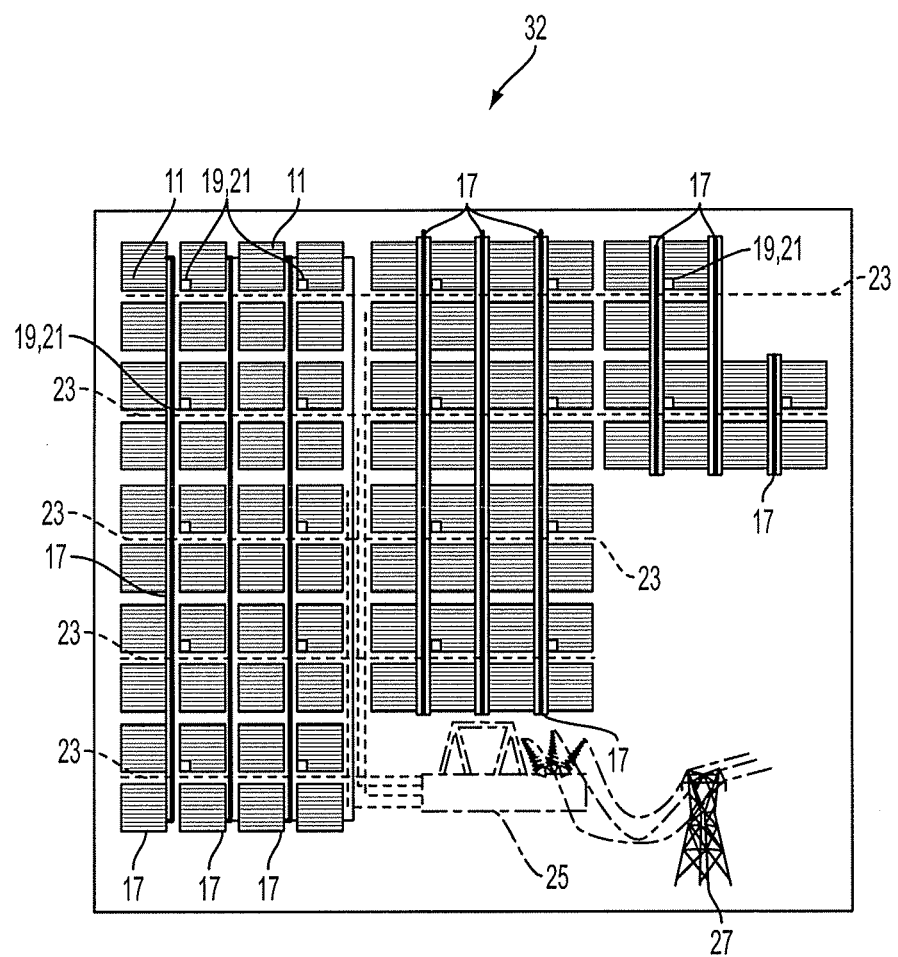
FIG. 3 illustrates a top down view of PV module array employing the FIG 1 system.
Figure 4:
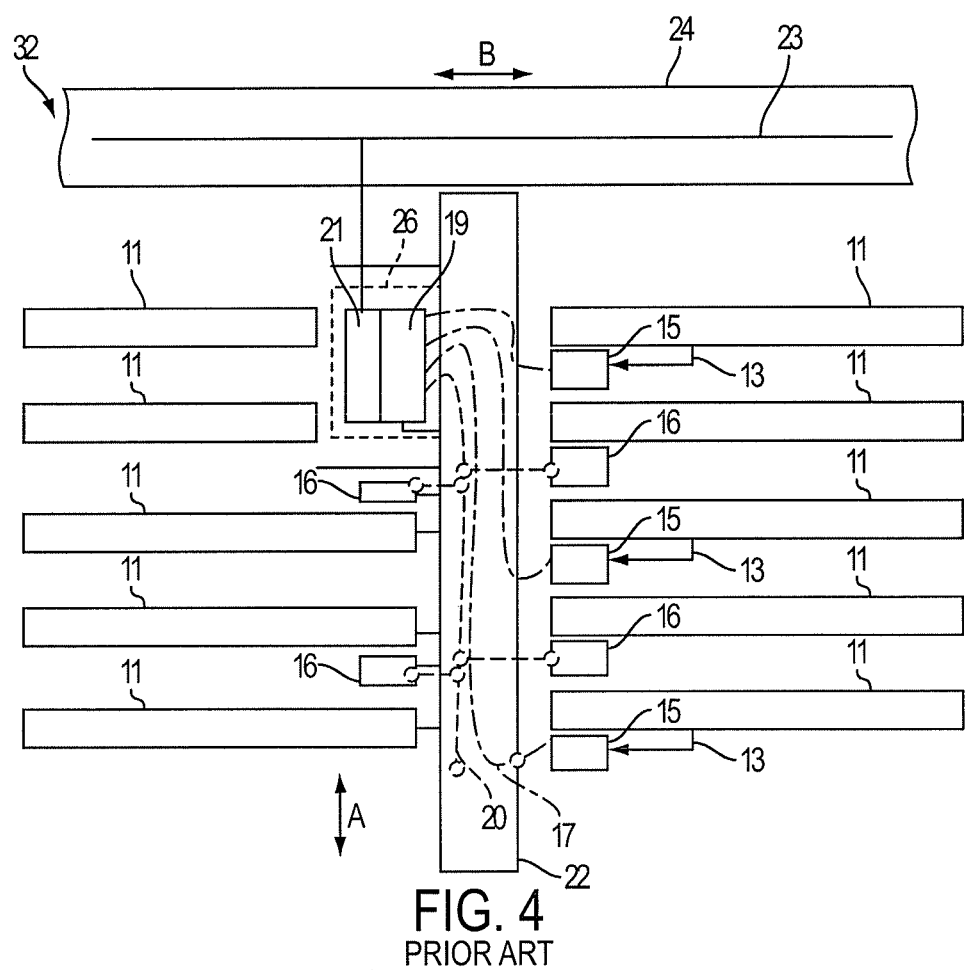
FIG. 4 illustrates in block diagram an enlarged portion of FIG 3.
Figure 8:
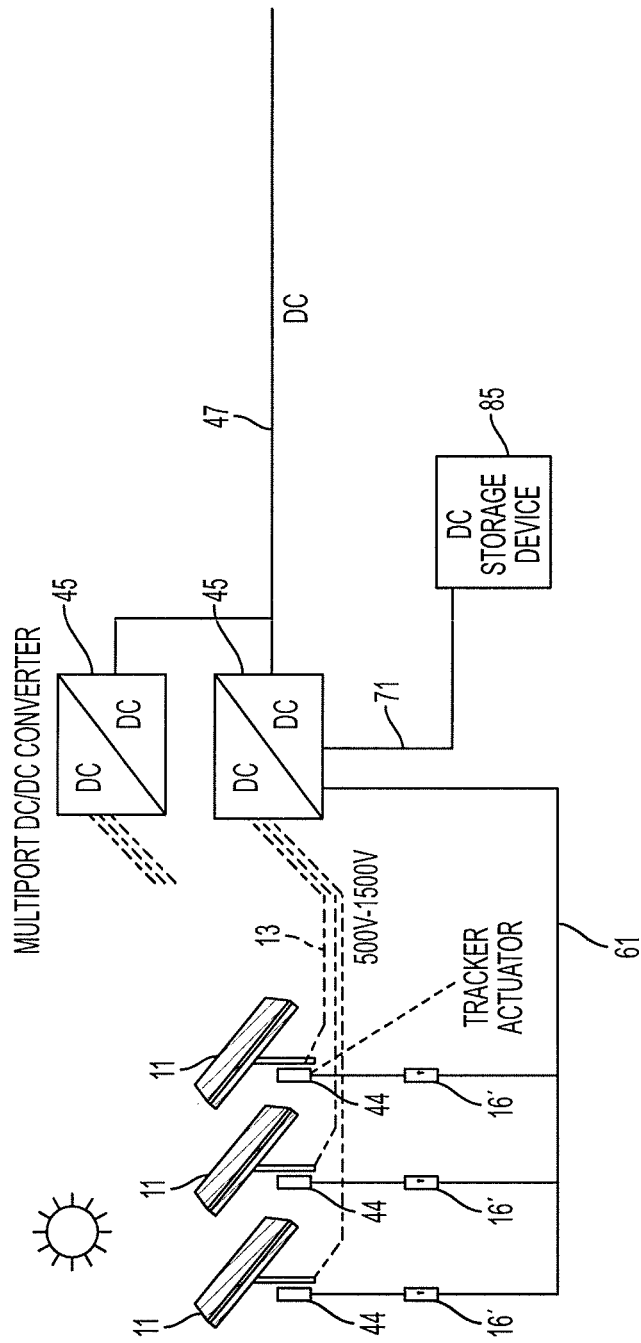
FIG. 8 illustrates an additional aspect of the FIG 5 embodiment.

The FIG 2 back-up power supply 71 and the supply of AC voltage back into the array for powering tracker actuators 44 for the PV modules, used in the AC bus 23 system shown in FIGS. 1-4, can further be simplified in the MVDC system by a modification of the FIGS. 5-7 embodiment. FIG 8 shows this. In FIG 8 back-up DC storage can be provided in the array 32' by a DC connection line 71 between a multiport DC/DC converter 45 and a DC storage device 85, which can include a battery bank. In addition, as shown in FIGS. 7 and 8, control signals and voltage for tracker actuators 44 can also be supplied by the multiport DC/DC converter 45, through tracker controllers 16', via lines 61 without requiring AC wiring from in-array inverters 19, as in the FIGS. 1-4 system, thereby further reducing wiring costs and simplifying installation. Alternatively, the tracker controller 16' can be implemented within the multiport DC/DC converter 45 hardware, as shown as item 77 in FIG 10 discussed below in which case the tracker output from the DC/DC converters 45 can be supplied directly to the tracker actuators 44.

Figure 9:
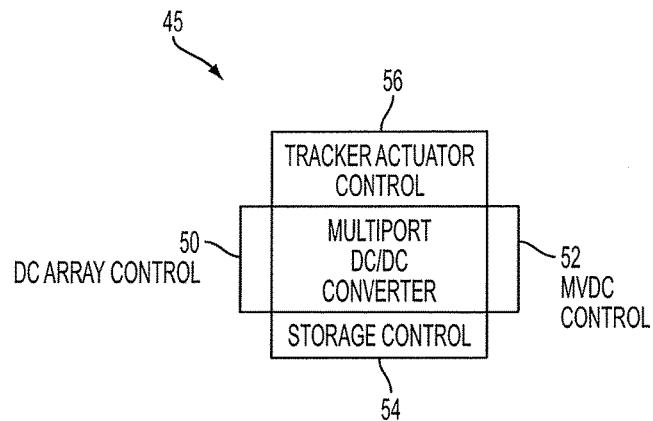
FIG. 9 illustrates the functional parts of a multiport DC/DC converter used in the FIGS. 5 through 8 embodiments.

FIGS. 9-15 illustrate one embodiment of the multiport DC/DC converters 45. FIG 9 shows the multiport DC/DC converter 45 as including input and output ports 50 and 52 having terminals for respectively interfacing with PV modules 11 of the array 32' by way of lines 13 and with the DC bus 47. As further shown in FIG 9, the multiport DC/DC converter 45 may also include ports 54 and 56 having terminals for respectively interfacing with a DC storage device 85 and directly with the tracking actuators 44, if the DC/DC converters include an internal tracking controller 16', or with external tracker controllers 16' which in turn control tracker actuators 44.

Figure 10:
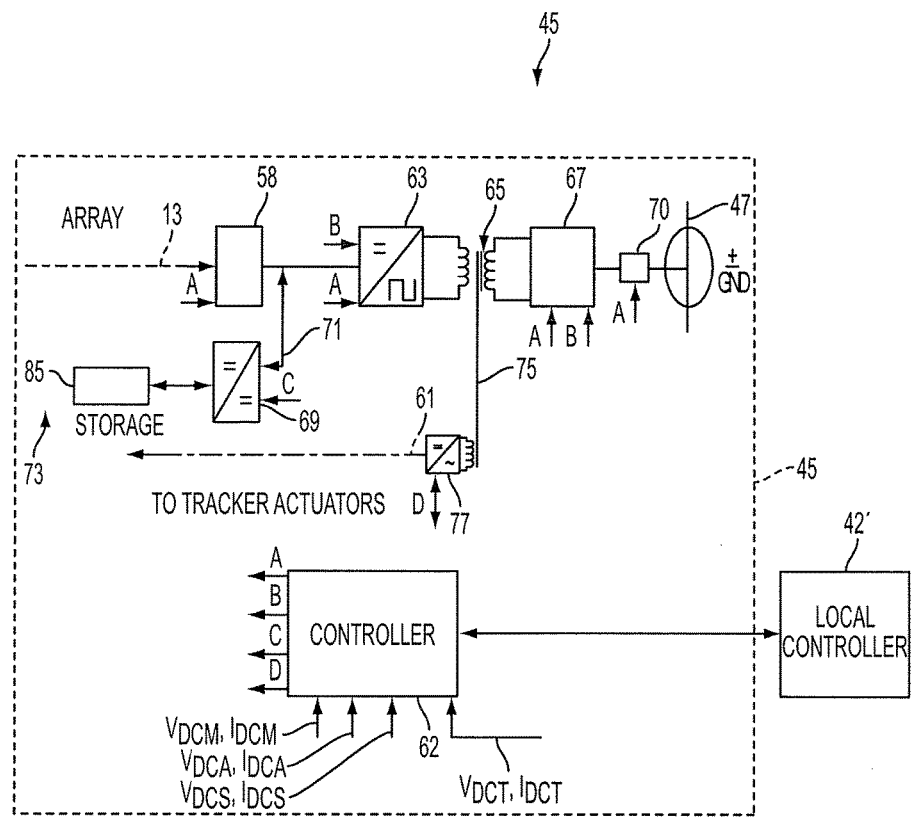
FIG. 10 illustrates the construction of the multiport DC/DC converter.

One example of the internal structure for a multiport DC/DC converter 45 is shown in FIG 10. A DC/DC combiner 58 receives PV module 11 voltage on lines 13 (only one such line 13 is shown in FIG 10) at up to 2 kv DC, e.g. in the range of 1-2 kv DC and supplies a combined DC voltage to a DC/AC inverter 63 which in turn supplies a high frequency AC voltage to transformer 65. The transformer 65 steps up the AC voltage to a higher AC voltage such as in the range of up to 20 kv, for example, in a range of 5 kv to 20 kv, e.g. 10 kv. The stepped-up AC voltage at the output of transformer 65 is converted back to DC voltage at an AC/DC converter 67, which provides the higher medium voltage (MVDC) DC voltage to the DC bus 47 through a disconnect switch 70.

FIG 10 also shows additional structures, which may be implemented in association with the multiport DC/DC converter 45. One such additional structure is an internal or external DC storage device 85, which is connected to a bidirectional DC/DC converter 69, which is, in turn, connected via a DC voltage line 71 to an output of combiner circuit 58. The storage device 85 can store DC power from the PV modules 11 and release it back to augment the medium voltage DC output under transients, e.g. cloudy conditions, and for other purposes, such as a transient DC fault, or a black start of the grid, as discussed below.

The PV modules 11 may also have associated tracker actuators 44 and linkages connected to pivoting PV module 11 holding tables, which are arranged to pivot the PV modules 11 in order to track the sun, or for bringing the PV module to a predetermined position for maintenance, cleaning, safe storage or replacement of the PV modules 11. The voltage for the tracker actuators 44 is provided by coupling the step-up transformer 65 to an AC/DC converter 77, which supplies the tracker voltage and control signal on line 61 to tracker actuator 44. Alternatively, if tracker controller 16' is implemented outside DC/DC 45, an AC voltage directly from transformer 65 and control signals from the DC/DC converter 45 can be used to power and control the tracker controller 16' which in turn controls the actuators 44 and thus rotation of PV modules 11 provided on rotating tables.

As further shown in FIG 10, the multiport DC/DC converter 45 also includes an internal controller 62 for controlling various functions of the multiport DC/DC converter circuit 45. Controller 62 is connected to local controller 42' for exchanging data and commands between them. One local controller 42' can control a plurality of multiport DC/DC converters 45. Local controller 42' exchanges data and commands with the power plant controller 60' (FIG 5). Controller 62 also sends commands, illustrated as group of commands A, B, C and D, corresponding to the ports shown in FIG 9. Commands A are sent to the DC/DC combiner circuit 58, or alternatively to the DC/AC converter 63, or to both 58 and 63, to control the array voltage, current, or power input to the multiport DC/DC converter 45. Commands B are sent to the AC/DC converter 67, or alternatively to the DC/AC inverter 63, or to both 63 and 67, to control voltage, current or power from the AC/DC converter 67 applied onto DC bus 47. Commands C are sent to DC/DC converter 69 to control storage of voltage from the output of DC/DC combiner 58 to storage device 85, or to supply voltage from the storage device 85 to the input of DC/AC converter 63. Commands D are sent to the AC/DC converter 77 to control the voltage and commands supplied to tracker 44. If AC voltage and commands are supplied to an internal tracker controller 16' a control device is provided in AC voltage line 75 for this purpose, which is controlled by the Commands D.

FIG 10 also shows voltage and current inputs taken at various locations associated with the multiport DC/DC converter 45, including $V_{DCM}$, $I_{DCM}$ representing the voltage and current applied by the multiport DC/DC converter to DC bus 47, $V_{DCA}$, $I_{DCA}$, representing the input voltage and current received from the PV modules 11, $V_{DCS}$, $I_{DCS}$ representing the voltage and current supplied to or received from storage device 85 and $V_{DCT}$, $I_{DCT}$ representing the voltage and current supplied to the tracker actuators 44 or external tracker controllers 16'.

Figure 11:
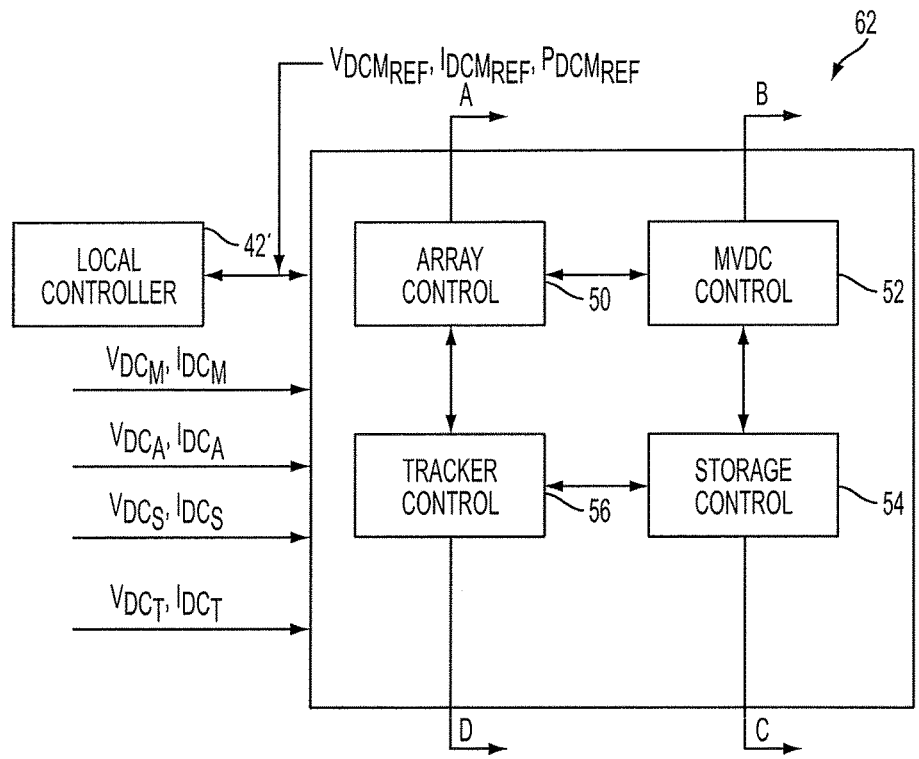
FIG. 11 illustrates the controller used in the multiport DC/DC converter.

FIG 11 illustrates the internal construction of controller 62. The controller may be implemented as a programmable logic controller, a process controller, a microprocessor or other structure capable of implementing control functions. The controller 62 includes logic modules 50, 52, 54 and 56, implemented as hardware or software, or both, each for respectively supplying the commands A, B, C, D. The logic modules may share information among themselves, as illustrated by the double-headed areas within controller 62. The controller 62 also receives voltage, current and power commands $Vdcm_{REF}$, $Idcm_{REF}$, and $Pdcm_{REF}$ for power to be supplied on DC bus 47 from the local controller 42', which in turn receives or exchanges commands from the power plant controller 60'.

Figure 12:
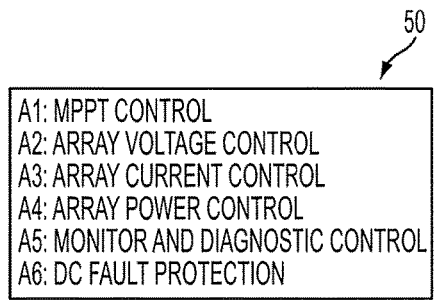
FIG. 12 illustrates control functions which may be performed by a multiport DC/DC converter controller for controlling the electrical quantities of PV array.

FIG 12 illustrates the functional commands A issued by logic module 50, which serve to control the PV modules 11 voltage, current or power inputs to DC combiner 58. An input circuit in combiner 58, or in the DC/AC converter 63, can adjust the voltage, current or power applied to the multiport DC/DC converter 45 from the PV modules 11. The command A can be further broken down into commands A1 . . . A6 in which A1 represents commands to operate the PV modules 11 input to DC/DC combiner 58 to achieve maximum power point tracking (MPPT), A2 represents commands to control PV modules 11 voltage input to DC/DC combiner 58, A3 represents commands to control the current from the PV modules input to DC/DC combiner 58, A4 represents commands to control the power of the PV modules 11, input to DC/DC combiner 58, A5 represents commands to perform monitoring and diagnostic functions for the PV modules 11, and A6 represents commands for operation of the DC/DC converters 45 when there is a DC fault on bus line 47, as will be described below. As noted, the DC bus line 47 includes +Ve, −Ve, and ground wires. A DC fault may occur when there is a short between the +Ve and −Ve wires or between the +Ve or −Ve wires and the ground wire.

Figure 13:
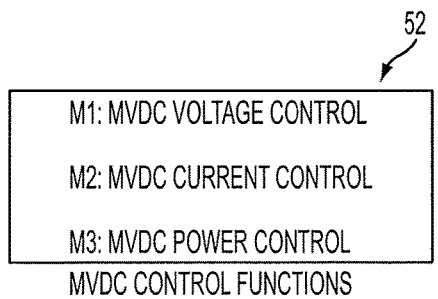
FIG. 13 illustrates control functions which may be performed by the multiport DC/DC converter controller for controlling voltage on a DC bus.

FIG 13 illustrates the functional command B, issued by logic module 52, for controlling the voltage, current and power applied to the MVDC DC bus 47. The command B can be further broken down into commands M1 . . . M4 which are used to control the output of AC/DC converter 63, or alternatively the DC/AC inverter 3, or both. Command M1 controls the voltage applied to DC bus 47, command M2 controls the MVDC bus 47 current, command M3 controls the power applied to MVDC bus 47, and command M4 represents commands when there is a DC fault on DC bus line 47.

Figure 14:
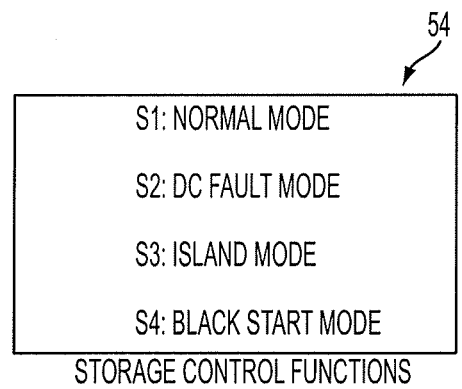
FIG. 14 illustrates control functions which may be performed by the multiport DC/DC converter controller for controlling an energy storage device.

FIG 14 illustrates the functional commands C, issued by logic module 54, for managing the voltage and flow of current to and from storage device 85. The commands C can be broken down into command Si for a normal mode of operating in which energy is stored in the storage device 85 or released from the storage device 85 depending on operating conditions of the grid as commanded by the local controller 42', command S2 for a mode of operation when a DC fault occurs, in which case power generated within the multiport DC/DC converter 45 can be absorbed by storage device 85, command S3 for operating the array 32' in an islanding mode, and command S4 for operating the storage device 85 for a black start of the power grid 27.

Figure 15:
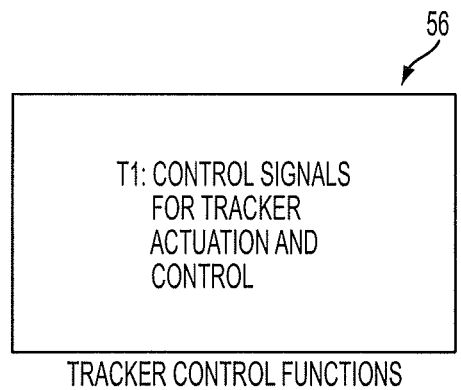
FIG. 15 illustrates control functions which may be performed by the multiport DC/DC converter controller for controlling a tracker; and, FIG. 16 illustrates control functions which may be performed by a power plant controller.

FIG 15 illustrates the functional commands D, issued by logic module 50 for controlling operation of an external tracker controller 16', or directly controlling the tracker actuator 44. In this case the command T1 provides the power and signals needed to operate the tracker controller 16' or the tracker actuator 44.

Control of the multiport DC/DC converters 45, is affected by the power plant controller 60' (FIG 5) through the local controller 42', or alternatively by controlling the multiport DC/DC converter directly through internal controller 62 by a direct connection with the power plant controller 60'. Alternatively, the power plant controller 60' can issue commands to inverter 49, which forwards them to local controller 42' or directly to the internal controller 62. The power plant controller 60' also controls operation of DC/AC inverter 49 to manage the DC bus 47 and the output of the inverter 49 for supplying power to the grid 27. The power plant controller 60', at the point of interconnection with the grid, measures grid voltage, current, and frequency and, receives data and instructions from SCADA (Supervisory Control and Data Acquisition system). The power plant controller 60' commands set points, and supplies commands to the inverters 49 and to multiport DC/DC converters 45 directly or indirectly through local controller 42' or inverter 49, to control operation of the array and voltage on the MVDC bus 47. Internal control of the multiport DC/DC converters 45 is through the controller 62 and the internal logic modules 50, 52, 54 and 56. The power plant controller 60' also controls inverter 49 to manage, with the multiport DC/DC converters 45, the voltage, current and power on DC bus 47.

Figure 16:
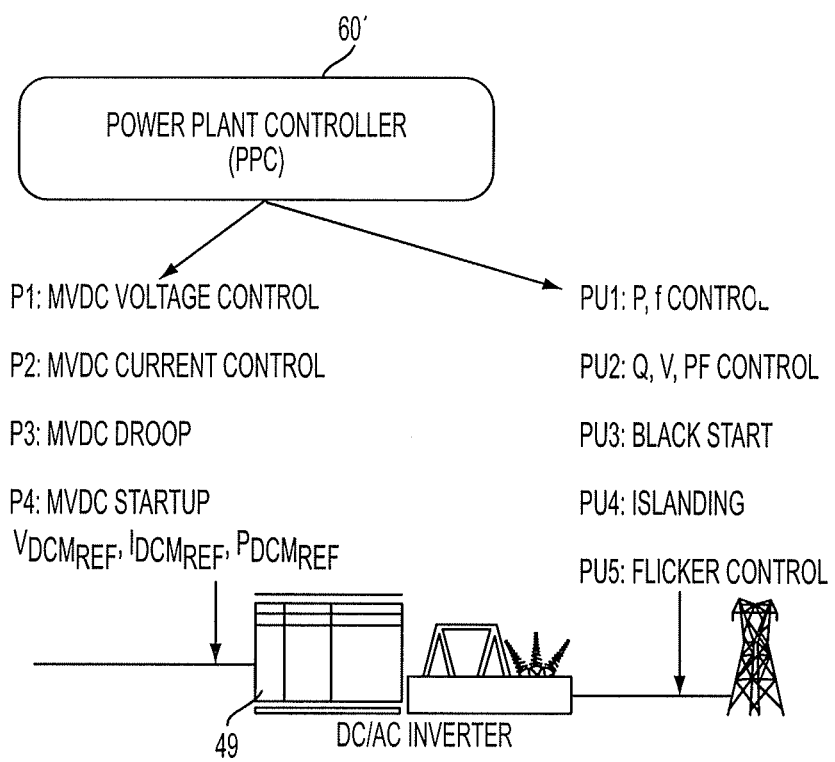

Some functions which can be performed by the power plant controller 60' with respect to controlling the output of inverters 49, and thus what is applied to the grid 27, and with respect to controlling DC bus 47 by inverters 49 are shown by FIG 16. The power plant controller 60' can issue commands P1 . . . P4 to the inverters 49 to perform functions with respect to the DC bus 47. Command P1 instructs the inverter 49 to set a predetermined voltage on DC bus 47. Command P2 causes the inverter 49 to set a predetermined current on the DC bus 47. Command P3 controls voltage droop on the DC bus 47. Command P4 affects start-up of voltage generation by the inverters 49. The power plant controller 60' also sets a voltage $Vdcm_{REF}$, a current $Idcm_{REF}$, and a power $Pdcm_{REF}$ for the DC bus 47 as part of command P4.

The power plant controller 60' also sends the control signals PU1 . . . PU5 to the inverter 49 for controlling the inverter 49 output on the grid side. PU1 is a power (P) or frequency (f) control. PU2 sets a reactive power Q, or a voltage V, or a power factor PF control. PU3 controls inverter 49 to perform a black start of the grid. PU4 instructs the inverters 49 that the PV array will be operated without a connection to the grid or with a weak grid, that is, in the so-called islanding mode. PU5 commands the inverters 49 to control power or voltage flicker at the grid.

The commands P1 . . . P4 to the inverters 49 may also have associated commands which are sent from the power plant controller 60' directly or indirectly to the multiport DC/DC converter 45. There are numerous ways in which the power plant controller 60' can control the inverter 49 and multiport DC/DC converters 45, the latter directly or indirectly through local controller 42' or inverter 49. Some examples of how the power plant controller 60' can control the inverter 49 and multiport DC/DC converters 45 will now be described.

An example of an overall system control will now be described with reference to the power plant controller 60' and FIG 16. In one embodiment, during normal operation of the array, and in the control mode P1 where a desired power P is to be supplied to the grid using command PU1, the DC/AC inverter 49 is instructed by the power plant controller 60' to convert an AC grid voltage to an MVDC voltage for application to the DC bus 47. For the collection system, which comprises the PV modules 11 and multiport DC/DC converters 45, this voltage establishes a set point on the DC bus 47 for the multi-point DC/DC converters 45 when supplying current from the PV array to the bus 47. The MVDC voltage is regulated by the power plant controller 60' using command P1 to a predetermined voltage $Vdcm_{REF}$ value by the DC/AC inverter 49. Based on an active power P dispatch command PU1, which is preset value of power entered into the power plant controller 32 by SCADA, or another user operated setting device, and with knowledge of the MVDC voltage on the bus 47, the multiport DC/DC converters 45 are instructed by the power plant controller 60' to operate in a current control mode using command M2. The control exercised by the power plant controller 60' enables both the inverter 49 and the DC/DC converters 45 to jointly manage the voltage, current and power supplied on DC bus 47. However depending on desired system operation, the power plant controller 60' can also instruct the multiport DC/DC converters 45 to a voltage regulation mode with command M2, or a power regulation mode using command M3. The M1, M2, M3 commands control values MVDC voltage current or power injected by the multiport DC/DC converters 45 onto DC bus 47.

In a normal operating condition, by virtue of the MVDC voltage control being performed by the central DC/AC inverter 49, and current control by the multiport DC/DC converters 45, the power collected by the multiport DC/DC inverters 45 can be dispatched to the grid. Alternatively, if a service such as frequency (f) regulation for the grid under the command of PU1 is applied, the active power commanded by the power plant controller 60' can be varied and the command to multiport DC/DC converters 45 can be set by commands M1 . . . M3 accordingly to control the desired voltage, current or power injected into the DC bus 47. The DC/AC inverter 49, while setting the MVDC voltage, can also perform additional functions such as reactive power control, voltage control, power factor control, and flicker control of voltage applied to the grid using power plant controller 60' commands PU2, PU5, very similar to control of such parameters by a STATCOM, the key difference being that the active power loss in the DC/AC inverter 49 can be made up by the MVDC collection system, that is, by the PV array power and voltage on DC bus 47. These functionalities, along with the coordinated active power control provided at the multiport DC/DC converters 45 enables the overall PV power plant to offer a variety of ancillary services to the grid 27.

In one operating mode embodiment, the DC/AC inverter 49 performs active power control of the MVDC collection voltage under the command P3. Based on the resulting value of the MVDC voltage, which is observed by the multiport DC/DC converters 45 at their terminals, they control the values of injected active power and hence the total power P injected into the AC grid to satisfy the power P command function PU1. Other control functions can be applied to inverters 49 to achieve grid control goals of PU2 and PU5 by the power plant controller 60'.

In yet another operating mode embodiment, the DC/AC inverters 49 regulate the DC voltage on bus 47 and the distributed multiport DC/DC converters 45 operate in an MPPT mode under command Al issued by the power plant controller 60'. In this mode, the function PU1 is not performed by the power plant controller 60', whereas the functions PU2 and PU5 commanded by power plant controller 60' can be performed by the DC/AC inverter 49, in a manner well known in the art.

Related to the MPPT operation, one benefit of the FIG 5-16 architecture is the ability of the system to adapt to PV module voltage degradation over the plant life since the DC bus 47 voltage can be controlled. Additionally, it may be possible to realize additional energy by expanding the MPPT voltage control range since the array DC voltage on DC bus 47 is not dependent on a fixed MVDC voltage but can vary under control of the power plant controller 60'. In-array DC/AC PV inverters 19 (FIG 1) used in an MVAC system typically have limits on their MPPT voltage control range because they are dependent on a fixed MVAC voltage.

The power plant controller 60' can also manage the multiport DC/DC converters 45 when a DC fault occurs in DC bus line 47. A DC fault on bus line 47 can be detected by inverter 49 or by controller 62 which monitors voltage and current supplied to DC bus 47. When a fault is detected, it can be reported to power plant controller 60' which instructs the DC/DC converters 45 to first turn off DC combiner 58 and DC/AC converter 63 (through command A6). The A6 command to combiner 58 also instructs it to bypass the output current from the PV modules through its electronics. The disconnect switch 70 is then opened by command A6 to disconnect the multiport DC/DC converter from the DC bus 47. Thus, the DC/DC converter 45 is powered down and uncoupled from DC bus 47. The storage device 85 can also be operated during a DC fault under the command S2. When a DC fault occurs there will be a significant difference (power mismatch) between the power being generated at the output of combiner 58 and the power input to DC bus 47, resulting in a voltage swing inside the multiport DC/DC converter 45 and a stressing of its internal components. The storage device 85, through DC/DC converter 69, absorbs the power differential during this event and controls voltage within the DC/DC converter to a more benign value which can increase component life or allow a more efficient design of the multiport DC/DC converter 45.

When the DC fault is cleared, as reported to the power plant controller 60' by either inverter 49 or controller 62, the power plant controller 60 instructs inverter 49 and controller 62 to re-establish the connection of the DC/DC converter 45 to DC bus line 47 by first powering up the DC/DC converter 45 by command A6 to combiner 58 and DC/AC converter 65, which causes them to begin operating, followed by closing the disconnect 47 switch 70 by command A6. The DC/DC converters 45 themselves can also manage a DC fault by sensing a fault on DC bus 47 and automatically entering a fault mode which under commands A6 and S2, perform the operations described of powering down the DC/DC converters 45, by passing the PV module 11 input, and opening disconnect switch 70 and, when the DC fault is cleared, re-engaging the DC/DC converter 45, opening the bypass, and then the closing disconnect switch using commands A6 and S2.

Some examples of embodiments of system control under start-up, black start, islanding and night mode are now described.

There are three primary methods to start the solar power plant under control of the power plant controller 60', which commands the inverter 49 and the multiport DC/DC converter 45. The first is using an AC grid voltage after night time, which is a normal method for starting the MVDC PV power plant. A second method is using the PV array 32' and the self-starting multiport DC/DC converters 45 to perform a black start and islanding operation. The third method is using storage devices 85 to perform a black start and islanding operation.

During the night, when solar energy is not being collected, and in the subsequent daytime operational mode, the start-up of the PV array by the power plant controller 60', depends on the status of the plant in the night mode when solar power is not available. If, under instruction of the power plant controller 60', the DC bus 47 remains charged by the DC/AC inverter 49 overnight, the solar plant will consume the differential power from the AC grid. In this mode, the MVDC bus 47 is charged by inverter 49 to the MVDC voltage. This option is beneficial if the distributed energy storage by the storage device 85 is used to supply the power consumed by the solar power plant due to DC/AC inverter 49 losses, auxiliary power for facilities in the substation 25 and any losses in the DC bus 47 cable. As an alternative, the DC/AC inverters 49 can be electronically isolated from the DC bus 47 and the MVDC bus 47 can be allowed to discharge overnight which can reduce the degradation of the collection cable system over time as the bus 47 is disconnected from the DC/AC inverter 49. The multiport DC/DC converters 45 are also electronically isolated as well. In this mode, the AC grid supplies the losses for the main substation transformer 51 and the power for any local facilities operated at the substation 25.

Start-up using the AC grid is now described. Based on the status of the power plant in the night mode, the DC/AC inverters 49 and the MVDC bus 47 are engaged by commands P4 to the inverter 49. Under this command, the MVDC bus 47 is pre-charged to a known value $Vdcm_{REF}$ through the DC/AC inverters 49 and thus to a known collection system voltage. If the inverter 49 is already supplying an MVDC voltage on DC busses 47 for night time operation, this is sufficient to pre-charge the DC bus 47. The multiport DC/DC converters 45 are then engaged under control of the power plant controller 60' one by one, or in a group, per a desired control method, as solar power is available, to ramp up the active power of the array and apply that power to the DC bus 47. As noted, the command M2 may be used to control current supplied from the multiport DC/DC converter to the DC bus 47 to obtain a desired $Idcm_{REF}$ and $Pdcm_{REF}$.

Another method of starting up and operating the solar power plant, for the so-called black start and islanding operations, will now be described. In this method self-starting of the multiport DC/DC converters 45 is employed in the absence of an MVDC voltage applied to the DC bus 47 by inverter 49. Black start can be performed by the MVDC solar power plant where the AC grid voltage is not available at all or too weak to pre-charge the DC bus 47. When solar power is available, the self-starting multiport DC/DC converters 45 are instructed to wake up in self-start mode under control of local controller 42' and/or control from power plant controller 60' and generate a MVDC voltage under the command M3 approximately equal to the rated MVDC voltage $Vdcm_{REF}$ for the DC bus 47. A group of multiport DC/DC converters 45 in this mode can also operate in the MVDC voltage control mode under command Ml to perform maximum power point tracking. Auxiliary power and control power for the DC/AC inverter 49 and for facilities at the main substation 25 can be derived from the energized MVDC bus 47. The DC/AC inverter 49 is then started under control of the power plant controller 60' to operate in, for example, a sign wave mode to establish a three phase AC voltage of suitable amplitude and frequency for application to the grid 27. The strength of this voltage established by the DC/AC inverter 49 is equal to the short circuit current capacity of the DC/AC inverter 49 which is typically strong enough to start a generator located in the power system on the grid 27 far away from the solar power plant. In other words, a generator on the grid can be started using voltage supplied from the PV array. This operating mode can also be used for an islanding operation where the solar power plant is not connected to a grid, or is connected to a weak grid.

Start-up of the PV array can also be affected by using energy stored in the energy storage devices 85. In this example, when solar power is not available, and a grid voltage is not available to inverter 49, a black start cannot be performed by using voltage from the PV modules 11. However, with adequate energy storage in the storage devices 85, the MVDC collection system can be energized using the stored energy and under command S4 to apply an MVDC voltage from the storage devices 85 to the DC bus 47. Thereby, the DC/AC inverters 49 are energized to perform a black start of the system. Likewise, the energy stored in the storage devices 85 can also be used to supply voltage on the MVDC bus 47 under command S3 for an islanding operation, when solar power from the PV modules 11 is not available. Later, when solar power is available, the storage devices 85 can be operated in a normal operating mode under command S1 and after a black start or initiation of an islanding operation power to the DC bus 47 originates from the PV modules 11.

In a normal operation of the PV array, the multiport DC/DC converters 45 operate the array in a MPPT mode under command A1 in which the electrical quantities on the array terminals of the multiport DC/DC converters 45 is controlled to regulate either array voltage $V_{DCA}$ or current $I_{DCA}$ or a combination of both to harvest maximum power from the PV modules 11. In other operating conditions such as when the power plant controller 60' is performing active power (P) or frequency (f) regulation using inverter 49 under control PU1, the array controller module 50 comes out of the MPPT mode and performs under commands A2, A3, or A4 from the power plant controller 60' to generate the required value of commanded active power which is injected to the DC bus 47.

The multiport DC/DC converters 45 internal controller 62 can also perform monitoring and diagnostic control functions for the PV modules 11. The combination of an array voltage $V_{DCA}$ or current $I_{DCA}$ can be applied to the PV modules 11 from the storage device 85, or from power taken from the DC bus 47 as supplied by inverter 49 to evaluate the degrading of the PV modules 11. In this mode, the DC voltage applied to the PV modules 11 and resulting current is sensed in order to generate well-known PV or VI curves for the modules 11 of the array as a whole. Thus, over time, any degrading of the PV modules 11 can be monitored and the data collected by controller 62 and forwarded to the power plant controller 60'. In addition, based on the level of the voltage and/or current degradation of the PV modules 11 the power plant controller 60' can instruct the DC/DC converters 45 using commands A and B to control the level of voltage current or power applied to the DC bus 47 which is appropriate to accommodate the sensed degradation.

The DC/DC converter 69 and DC/AC inverter 63 within the multiport DC/DC converter 45 can also include controls and protection schemes that are fast acting to mitigate the effects and results of electrical faults in the low voltage or medium voltage sides of the multiport DC/DC converter 45.

As noted above, the multiport DC/DC converter 45 can also operate simultaneously using the tracker control module 50 to receive tracker voltage $V_{DCT}$ and current $I_{DCT}$ and monitor the position of the tracker and, in turn, the output voltage and commands applied to the tracker actuator 44 directly, or through external tracker controller 16', to permit accurate tracking of the PV modules 11. Since the multiport DC/DC converters 45 can control the voltage, current or power input by the PV modules 11 at input port 50, and can also control the position of the tracker actuators 44, which also affect the voltage, current or power input by the PV modules 11 at port 50, the multiport DC/DC converters 45 can integrate these controls together. For example, the MPPT control at input port 50, and the tracker control at port 56, which are normally separately intended to maximize energy production of the array 32', can be integrated together such that both are controlled in a coordinated manner to optimize energy production by array 32'. If, for example, the energy output of the array 32' must be curtailed, the control modules 50 and 56 can conjointly determine the best way to curtail DC power production by limiting DC current through the DC/DC converter 45 and/or by moving the tracker angle to reduce available DC power into the DC bus lines 47.

As demonstrated, the use of all DC voltage in the array 32' and a medium voltage DC bus 47 simplifies array 32' wiring by eliminating the need for AC power wiring and associated AC wiring trenches in the array and eliminates the need for inverters and transformers within the array 32' allowing for installation of additional PV modules. In addition, there is no longer a requirement to supply three phase AC voltage from an AC substation back into transformers 21 in the array during nighttime to keep in-array transformers 21 energized. In addition, use of a long AC bus 23 in the array, which limits the control bandwidth of in-array inverters 19, is avoided. The problem of AC bus line 23, which have reactive power losses and require higher rated inverters 19 and transformers 21, is also avoided. Also, DC storage at the substations 25 (FIG 2) may be eliminated in favor of DC storage at the multiport DC/DC converters 45 and there is no need for DC tracker voltage to be acquired from the in-array inverters 19, further reducing equipment and installation costs, and reducing voltage losses. Still further, the overall power system in the embodiments of the invention, by employing fewer DC/AC inverters at the point of interconnection with grid 27 can achieve faster active and reactive power and voltage regulation, for example, using a STATCOM regulation at the power plant controller 60'. Additionally, the central MVAC inverter 49, since it does not have to control MPPT, has less control tasks to perform and can provide priority response to grid voltage control. In the FIGS. 1-4 PV plant, there are many inverters 19 that must be controlled to support the grid voltage and there is an inherent limit in the speed of response due to control bandwidth of the plant controller 60 and plant control network. Therefore, when high speed voltage control is needed, PV inverters 19 cannot be used and other devices (STATCOM) are added which adds cost and complexity to the overall system.

The array 32' voltage, current, and power can also be managed by the inverter 49 and DC/DC converter 45 conjunctionally, or under control of the DC/DC converters 45 as in, for example, a black start or islanding operation. Furthermore, the array 32' can perform a black start and operate in an islanding mode, which cannot be done with the AC bus system of FIGS. 1-4.

Although the invention has been described with respect to having an array of PV modules 11 as the inputs to the described system, the system can also be used with other power generating sources, such as wind generators, water turbines, geothermal generators, and others capable of generating an AC or DC voltage for connection to a utility grid. In addition, these other voltage generating sources can also be used as additional or auxiliary power generating sources with the PV modules 11 for supplying a MVDC voltage on DC bus 47. Such other voltage generating sources may be connected to DC bus 47 through a DC/DC converter 45, or to an existing DC/DC converter already connected to PV modules 11.

While specific embodiments of the invention have been shown and described the invention is not limited by such a description, as many modifications can be made without departing from the spirit and scope of the invention. Accordingly, the scope of the invention is not limited by the foregoing description, but is only limited by the scope of the appended claims.

What is claimed is:

1. A photovoltaic power system comprising:
    an array of photovoltaic modules including a plurality of photovoltaic modules providing a DC voltage output;
    a DC/DC converter connected to the plurality of photovoltaic modules for increasing the DC output voltage from the plurality of modules to a higher level DC output voltage and for controlling the higher level DC output voltage, current and/or power;
        wherein the DC/DC converter comprises a voltage combiner circuit for combining outputs from a plurality of PV modules and a step-up circuit for stepping up the combined PV voltage to the controlled higher level output voltage on the DC bus, and a control module for controlling the higher level DC output voltage applied to the DC bus;
        wherein the DC/DC converter comprises a multiport DC/DC converter having a plurality of controlled input and output ports, one of the output ports providing the controlled DC output voltage to the DC bus; and,
        wherein a controlled input port to the multiport DC/DC converter receives the output from the plurality of PV modules and the multiport DC/DC converter further comprises a control module for controlling at least one of voltage, current and power applied by the plurality of PV modules to the controlled input port;
    a substation provided at a location adjacent a point of interconnection to a utility grid, the substation comprising a DC/AC inverter;
    a DC bus for receiving the controlled higher level DC output voltage from the DC/DC converter and applying it to the DC/AC inverter;
    a plant controller for controlling the DC/AC inverter and the DC/DC converter to manage voltage, current and power on the DC bus; and,
    a PV module tracking structure for moving the plurality of photovoltaic modules, wherein the multiport DC/DC converter further comprises a tracker output port for providing voltage and commands to the tracking structure and a control module for controlling operation of the tracker output port.

2. A photovoltaic power system as in claim 1, further comprising a transformer located at the substation for stepping up the AC output voltage of the inverter for connection to the grid.

3. A photovoltaic power system as in claim 2, wherein the power plant controller receives measured parameters of the utility grid and supplies commands to the DC/AC inverter and DC/DC converter for operating the system.

4. A photovoltaic power system as in claim 3, wherein the power plant controller instructs the DC/AC inverter to apply the higher level DC voltage to the DC bus during nighttime operation of the system.

5. A photovoltaic power system as in claim 3, wherein the power plant controller instructs the DC/AC inverter to apply no voltage to the DC bus during nighttime operation of the system.

6. A photovoltaic power system as in claim 3, wherein the power plant controller instructs the DC/AC inverter and DC/DC converter to operate the system in a black start of the power grid.

7. A photovoltaic power system as in claim 3, wherein the power plant controller instructs the DC/AC inverter and DC/DC converter to operate the system in an islanding mode.

8. A photovoltaic power system in claim 1, wherein a DC voltage from the plurality of modules is up to 2 kv DC.

9. A photovoltaic power system as in claim 1, wherein the higher level voltage on the DC bus up to 20 kv DC.

10. A photovoltaic power system as in claim 1, wherein one of the ports is a controlled input/output port coupled to a DC storage device, the multiport converter further comprising a control module for controlling the input/output port.

11. A photovoltaic power system as in claim 1, further comprising a controllable bidirectional DC/DC converter for coupling the storage device to the output of the combiner circuit.

12. A photovoltaic power system as in claim 1, wherein the DC/DC converter integrates control of the control module for controlling at least one of the voltage, current and power applied by the PV modules and the control module for controlling operation of the tracker port such that the control modules are conjunctively used to control voltage, current or power applied to the DC/DC converters by the PV modules.

13. A photovoltaic power system as in claim 1, wherein the DC/DC converter comprises:
    a DC/AC converter coupled to the output of the voltage combiner circuit;
    an AC transformer coupled to an output of the DC/AC converter for stepping up the output AC voltage to a higher level AC voltage; and,
    an AC/DC converter coupled to the AC transformer for providing a DC output having the higher level DC voltage.

14. A photovoltaic power system as in claim 13 wherein the control module further controls the voltage combiner circuit and/or the DC/AC converter of the DC/DC converter to control at least one of the voltage, current and power input from the PV modules to the DC/DC converter.

15. A photovoltaic power system as in claim 14 wherein the control module controller operates the DC/DC converter to provide maximum power point tracking (MPPT) for the PV modules.

16. A photovoltaic power system as in claim 13 further comprising a storage device coupled to the DC/DC converter for receiving voltage from or supplying voltage to the DC/DC converter, and wherein the control modules manages the flow of voltage to and from the storage device.

17. A photovoltaic power system as in claim 1, wherein the PV module tracking structure comprises PV module tracking actuators and wherein the DC/DC converter supplies operating voltage and commands for the tracking actuators.

18. A photovoltaic power system as in claim 1 further comprising an additional DC power generator coupled to the DC bus.

19. A photovoltaic power system as in claim 18 wherein the additional power generator is coupled to the DC bus through the DC/DC converter to which the PV modules are connected or through an additional DC/DC converter.

20. A photovoltaic power system as in claim 1 wherein the DC/AC inverter regulates the value of DC voltage applied to the grid as a function of power required to be delivered to the grid.

21. A photovoltaic power system as in claim 20 wherein the DC/DC converter generates output power to the DC bus based on voltage set on the DC bus by the DC/AC inverter.

22. A photovoltaic power system as in claim 1 wherein the DC/AC inverter regulates the value of voltage on the DC bus to a predetermined value and the power plant controller commands the DC/DC converter to generate a predetermined value of current to the DC bus.

23. A photovoltaic power system as in claim 1 wherein the DC/AC inverter regulates the value of voltage on the DC bus to a predetermined value and the power plant controller commands the DC/DC converter to apply maximum power point tracking for the PV modules.

24. A photovoltaic power system comprising:
an array of photovoltaic modules including a plurality of photovoltaic modules providing a DC voltage output;
a DC/DC converter which includes a self-start capability, connected to the plurality of photovoltaic modules, for increasing the DC output voltage from the plurality of modules to a higher level DC output voltage;
a DC/AC inverter provided at a location adjacent a point of interconnection to a utility grid and outside the array;
a DC bus for receiving the controlled higher level DC output voltage from the DC/DC converter and applying it to the DC/AC inverter; and
a power plant controller for controlling the DC/DC converter and the DC/AC inverter such that the DC/DC converter operates in a self-start mode.

25. A photovoltaic power system as in claim 24 wherein the power plant controller controls the DC/AC inverter and the DC/DC converter to perform a black start of the utility grid in which the DC/AC inverter generates a grid voltage and frequency and the DC/DC converter self-starts and supplies power to the DC/AC inverter over the DC bus to enable the black start.

26. A photovoltaic power system of claim 24 wherein the power provided by the DC/DC converter to the DC bus during a self-start mode includes power supplied by at least the plurality of PV modules.

27. A photovoltaic power system as in claim 24 further comprising a DC storage device, and wherein the power provided by the DC/DC converter to the DC bus during the self-start mode includes power supplied by at least the storage device.

28. A photovoltaic power system as in claim 24 wherein the power plant controller controls the DC/AC inverter and the DC/DC converter to operate in an islanding mode in which the DC/AC inverter generates an island voltage and frequency output and the DC/DC converter supplies a controlled voltage to the DC/AC inverter over the DC bus to enable the islanding voltage and frequency output.

29. A photovoltaic power system as in claim 24 further comprising a disconnect switch between the DC/DC converter and the DC bus.

30. A photovoltaic power system as in claim 29 wherein the DC/DC converter, in response to a fault condition on the DC bus, stops generating DC power and, after DC power is no longer generated, opens the disconnect switch.

31. A photovoltaic power system as in claim 30 wherein the fault condition is detected by the DC/DC converter.

32. A photovoltaic power system as in claim 30 wherein the fault condition is detected by the DC/AC inverter and reported directly or indirectly to the DC/DC converter and/or the power plant controller.

33. A photovoltaic power system as in claim 30 wherein, in response to the fault condition, the DC/DC converter also bypasses the output from the PV modules to prevent that output from entering the DC/DC converter.

34. A photovoltaic power system as in claim 30, further comprising a storage device associated with the DC/DC converter which absorbs power mismatch within the DC/DC inverter during the DC fault condition.

35. A photovoltaic power system as in claim 30 wherein the DC/DC converter, when the fault condition clears, restarts the generation of DC power and after restarting generation of DC power, closes the disconnect switch.

36. A photovoltaic power system comprising:
a plurality of photovoltaic modules arranged in an array;
a plurality of controllable DC/DC converters located within the array, each connected to a respective plurality of modules for converting DC voltage received from the respective plurality of modules to a higher controlled DC voltage, within the range of ±5 kv to ±20 kv;
a plurality of tracking actuators for moving the plurality of photovoltaic modules, wherein the DC/DC converters each further controllably supply voltage and commands for controlling actuators for the respective plurality of modules;
an inverter, located outside the array, for converting a received DC voltage within the range of ±5 kv to ±20 kv, to an AC voltage;
a transformer located outside the array and coupled to the inverter for stepping up the AC voltage to a grid voltage; and,
a plurality of DC bus lines connected to the plurality of DC/DC converters for feeding the higher controlled DC voltage to the inverter.

37. A photovoltaic power system as in claim 36, wherein the higher converted DC voltage is about ±10 kv DC.

38. A photovoltaic power system as in claim 36, wherein the inverter comprises one or more inverters, the photovoltaic power system further comprising one or more step-up transformers respectively coupled to the output of the one or more inverters for providing an AC grid voltage to a point of interconnection with a utility grid.

39. A photovoltaic power system as in claim 36, wherein each DC/DC converter comprises:
a DC combiner for receiving voltage from a plurality of PV modules;
a DC to AC converter coupled to the output of the DC combiner;
an AC transformer coupled to the output of the DC/AC converter for stepping up the AC voltage to an AC voltage in the range of ±5 kv to ±20 kv;
an AC/DC converter coupled to the AC transformer for providing a DC output having a voltage in the range of ±5 kv to ±20 kv; and,
a control module for controlling at least one of the voltage, current and power output of the DC/DC converter.

40. A photovoltaic power system as in claim 36, further comprising a DC storage device associated with the DC/DC converters for storing energy from the PV modules and releasing stored energy to the DC/DC converter.

41. A photovoltaic power system as in claim 36, wherein DC/DC converters each further comprise a controller for controlling electrical parameters of power supplied from an associated plurality of PV modules to the DC/DC converters.

42. A DC/DC converter for receiving a PV module voltage and providing a DC output voltage to a DC bus, the converter comprising:
   a controlled input port for receiving a DC voltage from a plurality of PV modules;
   a controlled output port for supplying a stepped-up DC output voltage to the DC bus;
   a controlled input/output port for connection to a DC storage device; and,
   a controller for operating the DC/DC converter by controlling at least one of a voltage, current and power at the input port, by controlling at least one of the voltage, current and power of the stepped up DC voltage at the output port, and by controlling the storage device input/output port; and,
   a controlled output port for supplying power to a tracker actuator, wherein the controller controls power supplied by the DC/DC converter to the tracker actuator.

43. The DC/DC converter as in claim 42, wherein the controller supplies control signals which cause the DC/DC converter to effect at least one of the MPPT control, voltage control, current control, and power control of the output of the PV modules applied to the input port.

44. The DC/DC converter as in claim 42, wherein the controller operates the DC/DC converter to operate the storage device in one of a normal mode, a DC fault mode, an islanding mode and a black start mode.

45. A photovoltaic power system comprising:
   an array of photovoltaic modules including a plurality of photovoltaic modules providing a DC voltage output;
   a DC/DC converter connected to the plurality of photovoltaic modules for increasing the DC output voltage from the plurality of modules to a higher level DC output voltage and for controlling the higher level DC output voltage, current and/or power;
   a substation provided at a location adjacent a point of interconnection to a utility grid, the substation comprising a DC/AC inverter;
   a DC bus for receiving the controlled higher level DC output voltage from the DC/DC converter and applying it to the DC/AC inverter;
   a plant controller for controlling the DC/AC inverter and the DC/DC converter to manage voltage, current and power on the DC bus, wherein the plant controller receives measured parameters of the utility grid and supplies commands to the DC/AC inverter and DC/DC converter for operating the system; and, wherein the plant controller provides control functions for instructing the DC/AC inverter and DC/DC converter to operate the system in an islanding mode.

46. The photovoltaic power system of claim 45, wherein the higher level voltage on the DC bus is within a range of ±5 to ±20 kv DC.

47. The photovoltaic power system of claim 45, wherein the DC/DC converter comprises a voltage combiner circuit for combining outputs from a plurality of PV modules and a step-up circuit for stepping up the combined PV voltage to the controlled higher level output voltage on the DC bus, and a control module for controlling the higher level DC output voltage applied to the DC bus.

48. The photovoltaic power system of claim 45, wherein the plant controller provides control functions for instructing the DC/AC inverter to apply the higher level DC voltage to the DC bus during nighttime operation of the system.

49. The photovoltaic power system of claim 45, wherein the plant controller provides control functions for instructing the DC/AC inverter to apply no voltage to the DC bus during nighttime operation of the system.

50. The photovoltaic power system of claim 45, wherein the plant controller provides control functions for instructing the DC/AC inverter and DC/DC converter to operate the system in a black start of the power grid.

* * * * *